United States Patent
Fuchs et al.

(10) Patent No.: US 9,626,033 B2
(45) Date of Patent: Apr. 18, 2017

(54) SCREEN UNIT WITH A TOUCH PANEL

(75) Inventors: Hans-Peter Fuchs, Kirchheim (DE); Manuel Krause, Niedernhausen (DE); Paul Kleist, Kaohsiung (TW)

(73) Assignee: Rohde & Schwarz GmbH & Co. KG, Munich (DE)

( * ) Notice: Subject to any disclaimer, the term of this patent is extended or adjusted under 35 U.S.C. 154(b) by 185 days.

(21) Appl. No.: 13/576,144

(22) PCT Filed: Jan. 28, 2011

(86) PCT No.: PCT/EP2011/000411
§ 371 (c)(1),
(2), (4) Date: Jul. 30, 2012

(87) PCT Pub. No.: WO2011/095310
PCT Pub. Date: Aug. 11, 2011

(65) Prior Publication Data
US 2012/0319975 A1    Dec. 20, 2012

(30) Foreign Application Priority Data

Feb. 3, 2010    (DE) .................. 10 2010 006 721
Apr. 13, 2010   (DE) .................. 10 2010 014 796

(51) Int. Cl.
*G06F 3/00*    (2006.01)
*G06F 3/041*   (2006.01)

(52) U.S. Cl.
CPC ............ *G06F 3/0416* (2013.01); *G06F 3/041* (2013.01)

(58) Field of Classification Search
CPC ... G06F 3/041; G06F 1/00; G06F 3/00; G06F 3/0416; G06F 3/0488
USPC .................................................. 345/173–179
See application file for complete search history.

(56) References Cited

U.S. PATENT DOCUMENTS

| | | | |
|---|---|---|---|
| 6,160,701 A | 12/2000 | Baker | |
| 2005/0219269 A1* | 10/2005 | Sakashita | G06F 3/041 345/685 |
| 2009/0213089 A1* | 8/2009 | Hwang et al. | 345/174 |

FOREIGN PATENT DOCUMENTS

| | | |
|---|---|---|
| EP | 1 469 383 A1 | 10/2004 |
| EP | 1 507 253 A2 | 2/2005 |
| EP | 1 710 671 A2 | 10/2006 |
| EP | 2 045 698 A2 | 4/2009 |

OTHER PUBLICATIONS

"μLCD-320232-P1T" Users Manual (4DGL Platform Only), Revision 1.1, 4D Systems Pty. Ltd., Sydney, Australia, Jan. 2008, 16 pages.

(Continued)

*Primary Examiner* — Michael Faragalla
(74) *Attorney, Agent, or Firm* — Christensen O'Connor Johnson Kindness PLLC

(57) ABSTRACT

A screen unit is connected via a first connection to a control unit. The control unit is connected via a second connection to an output unit. The control unit and also the screen unit are jointly supplied with electrical energy via the second connection. Moreover, data for controlling the screen unit are transmitted to the latter via both connections. In this context, the screen unit additionally provides a touch panel, wherein the touch panel is connected only to the control unit.

15 Claims, 4 Drawing Sheets

(56) References Cited

OTHER PUBLICATIONS

International Search Report issued in corresponding International Application No. PCT/EP2011/000411, filed Jan. 28, 2011, 3 pages.
"TSHARC™ 'Devil-Ray' Auto Detect 4, 5 & 8 Wire Analog Resistive Touch Screen Controller Board (Auto Detect RS-232 and USB)," Setup and Users Manual, Version 1.5, Part No. 04B_TSHARC10d_Users_R1_5_070807.doc, Hampshire Company, Inc., Brown Deer, Wisc., Aug. 2007, 13 pages.
"TSHARC™ 'Octopus' Touch Screen Controller Supports 4-, 5- & 8-Wire Analog Resistive Touch Screens RS-232, PS/2, USB," Setup and Users Manual, Version 1.6R, Part No. 04B_TSHARC_Octopus1.6Users_090827, Microchip Technology Inc., Brown Deer, Wisc., Aug. 2009, 15 pages.
International Preliminary Report n Patentability mailed Sep. 10, 2012, issued in corresponding International Application No. PCT/EP2011/000411, filed Jan. 28, 2011, 6 pages.

* cited by examiner

SCREEN UNIT WITH A TOUCH PANEL

TECHNICAL FIELD

The invention relates to a screen unit, especially a TFT screen unit, with a touch panel attached to the screen unit.

SUMMARY

On the one hand, touch panels attached to screen units facilitate the entry of data and navigation through various screen masks and, on the other hand, additional entry devices, for the attachment of which there is often no space available on the device, can be dispensed with. The screen masks can thus still be changed in a simple manner without regard to the arrangement of operating keys.

Accordingly, a touch panel is generally glued onto a conventional screen unit. Both the touch panel and also the screen unit are then connected, each with its own cable, to a computer system. In this case, however, the touch panel is connected to the computer system via a separate touch-panel controller. The screen unit is additionally connected to the electrical supply network via a further cable, so that ultimately, three connecting cables and a separate touch-panel controller are required and must be connected.

A display adapter, which is connected between a graphic card and an LCD screen is known from EP 1 507 253 A2. Given components, with the assistance of which the connected screen can be automatically recognized by the graphic card, are integrated on the display adapter. Commands, which are used, for example, to switch off the background lighting of the LCD screen, can be transmitted via the connection between the graphic card and the display adapter.

However, the disadvantage with EP 1 507 253 A2 is that only signals which can also be generated and/or processed by the graphic card can be transmitted via the cable between the graphic card and the display adapter. EP 1 507 253 A2 does not therefore disclose a screen with touch panel and would also not allow a transmission of the touch-panel data via the already existing cable connection, because the graphic card does not provide the necessary interfaces for this, so that separate cable connections would be necessary for the operation of a touch panel.

The invention is therefore based upon the object of providing a screen unit with a touch panel, wherein the screen unit should be connected to the touch panel in the simplest possible manner.

The object is achieved by a screen unit with touch panel according to the feature of claim 1. The dependent claims provide advantageous further developments of the invention.

In this context, the screen unit is connected via a first connection to a control unit. The control unit itself is connected in turn via a second connection to an output unit. Via the second connection, both the control unit and also the screen unit are jointly supplied with electrical energy. Furthermore, data for the control of the screen unit are transmitted to the latter via both connections. Moreover, the screen unit provides a touch panel, wherein the touch panel is similarly connected only to the control unit. This means that both the control unit and also the screen unit are supplied with electrical energy through a single connection, and at the same time, the display data to be visualized are sent to the screen unit via this connection, and position data coming from the touch panel can be transmitted to the output unit. Accordingly, it is possible for the screen unit to be manufactured together with the touch panel and the control unit in a very simple manner in production, and following this, at the final assembly stage, only a single connection needs to be made between the control unit and the output unit.

A further advantage of the invention is achieved if the control unit is formed on the printed-circuit board and this is connected rigidly to the screen unit. Accordingly, a module comprising the screen unit, the touch panel and the printed-circuit board of the control unit can be manufactured very simply. This module is then connected to the output unit in the final production stage via one connection, thereby reducing the costs for further connections as well as reducing production time. Especially in this context, it must be mentioned that the costs for cable and, above all, for cable assembly can no longer be neglected in small-scale production and/or in low-cost production.

A further advantage of the invention is achieved if a control device for the touch panel is arranged on or in the control unit. This control device is connected to the touch panel at one end and to the output unit at the other end, and contains the calibration data required for the touch panel. Following this, if the output unit is replaced, the touch panel can be operated without difficulty with the new output unit. In this context, it is particularly advantageous that the control device for the touch panel exchanges data with the output unit via the USB protocol. On the one hand, this interface is very widely distributed and well-known, and on the other hand, the control unit is supplied with electrical energy directly via this interface. This means that the power supply to the screen unit is switched off via the second connection, wherein the touch panel continues to be supplied with energy at the same time, and a simple stand-by operation of the screen unit can be realized. Because the control unit is preferably formed on the printed-circuit board anyway, the control device for the touch panel can also be integrated on the latter, so that a further, external peripheral can also be dispensed with.

A further advantage of the invention is achieved if an LVDS receiver, which communicates on the one hand directly with the screen and, on the other hand, via the second connection, with an LVDS transmitter which can be integrated directly in the graphic chip of the output unit, is arranged on the control unit. The low LVDS signal levels in this context also generate moderate interference emissions at high data rates. With a strong LVDS transmitter, cable lengths, for example, of more than 1 m can be managed. Optionally, the screen unit can also be connected via the control unit and the first and second connection directly to a display port terminal of the graphic chip of the output unit. The faster data rates achievable as a result can be used in order to operate the screen unit with a higher resolution.

A further advantage of the invention is provided if an EDID-EEPROM is arranged on the control unit. All relevant data which are required to operate the screen unit correctly are stored in this component. These include, inter alia, the screen size and timings. This component can be read out in a simple manner by the output unit via the second connection. Accordingly, a "plug and play" detection of the screen unit is possible.

A further advantage of the invention is achieved if the cable connections can be realized in a cost favorable manner by foil cables. Twisting and/or separate shielding are not required in view of the low signal level. The assembly of the foil cable can be implemented in a very simple manner, thereby further reducing costs.

DESCRIPTION OF THE DRAWINGS

Various exemplary embodiments of the invention are described by way of example below with reference to the drawings. Identical items have the same reference numbers. In particular, the corresponding Figures of the drawings are as follows.

DETAILED DESCRIPTION

Figure 1:
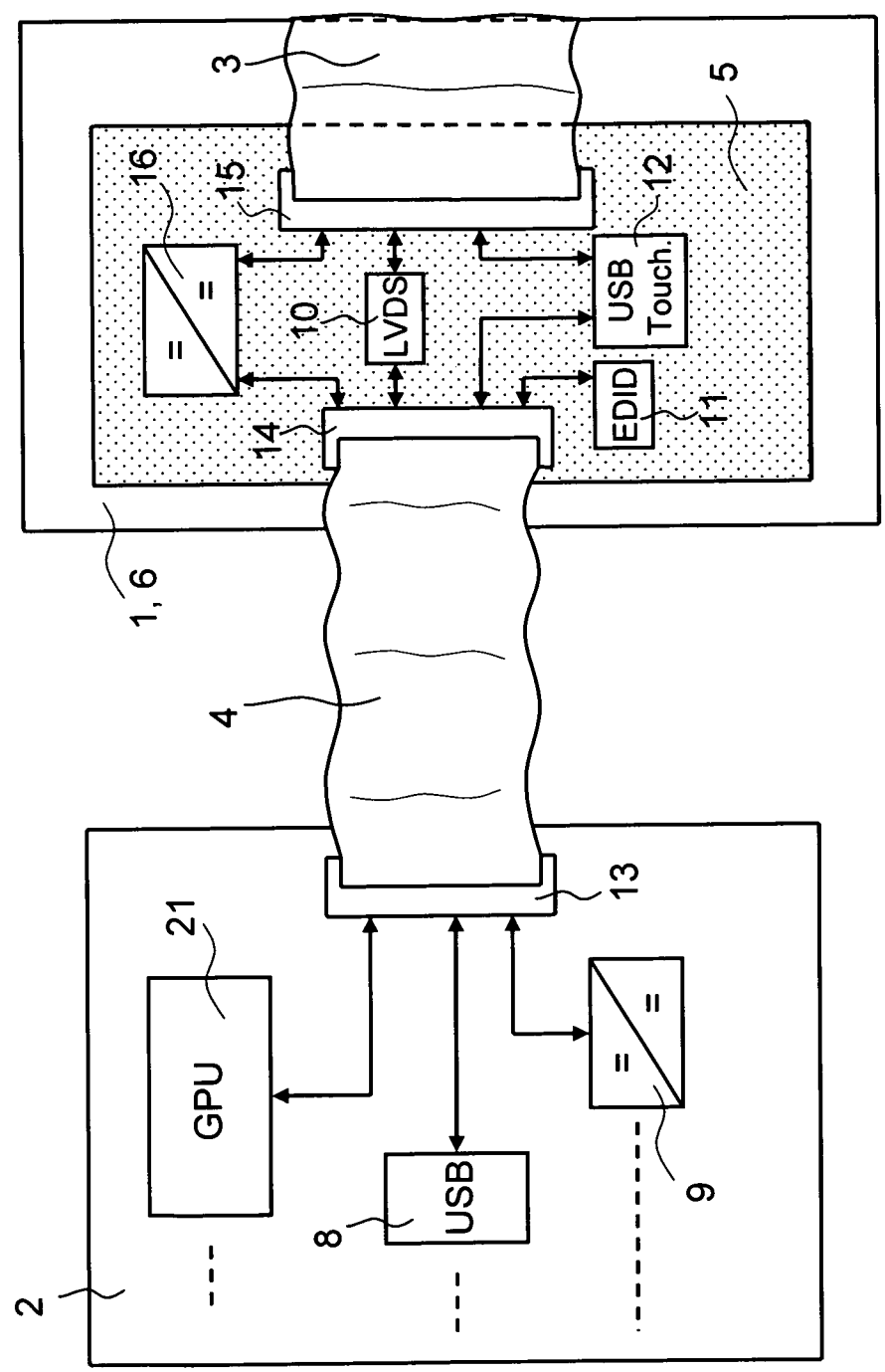
FIG. 1 shows an overview of the overall system of the exemplary embodiment of the screen unit with touch panel according to the invention.

FIG. 1 shows an overview of the overall system of the screen unit 1 with touch panel 6 according to the invention. The illustrated arrows are intended to visualize the dataflow between the individual components. The two central components of the invention, the output unit 2 and the screen unit 1 are visible. In this context, a control unit 5 is formed on a printed-circuit board, wherein the printed-circuit board is preferably rigidly connected to the screen unit. The printed-circuit board of the control unit 5 is illustrated in the drawings by a dotted area. The control unit is preferably a 4-layer, PCB-multilayer printed-circuit board 5. However, other embodiments with regard to the number of layers and also the type of substrate are also possible.

Two connectors 14, 15 are formed on the printed-circuit board of the control unit 5 in the embodiment according to the invention illustrated in FIG. 1. These connectors 14, 15 are preferably each ZIF connectors 14, 15. The output unit 2 is generally a computer system or a measuring-device system. Because it is not possible to illustrate all components contained in a computer system in the drawings, several dotted lines have been used to indicate that the output unit 2 can comprise further components.

The output unit 2 also provides at least one connector 13. This connector 13 is also preferably a ZIF connector. Via a second connection 4, the printed-circuit board of the control unit 5 is connected to the output unit 2. This second connection 4 is a cable connection and/or a plug connection. In FIG. 1, this second connection 4 is embodied as a cable connection via the two connectors 13, 14. The connecting cable for the second connection is preferably a foil cable, which is favorable with regard to purchasing and also cable assembly. In this exemplary embodiment, the cable is not twisted. However, it is also possible to use other cables, which are, for example, shielded and/or twisted.

In the exemplary embodiment according to the invention from FIG. 1, the touch panel 6 is integrated directly in the glass substrate of the screen unit 1. The screen unit 1 is preferably an LCD screen unit, however, other embodiments of the screen unit 1 which are suitable for the visualization of display data can also be used. The touch panel 6 is a touch-sensitive input device. The touch panel 6 is preferably a resistive touch panel 6. The use of a capacitive or inductive touch panel 6 is also possible even if these touch panels 6 require a special data-entry stylus for operation.

The connector 15 of the control unit 5 is connected to the screen unit 1 and the touch panel 6 via a first connection 3. In FIG. 1, this first connection 3 is embodied as a cable connection. By preference, foil cables are also used here. In the exemplary embodiment, a twisting of the cable in the first connection 3 has not been provided; however, twisted and/or shielded cables can also be used. In a further exemplary embodiment according to the invention which is not illustrated, the first connection 3 can also be embodied as a cable connection and/or as a plug connection. In this case, the connector 15 is replaced by a plug connection, which is arranged on the underside of the printed-circuit board of the control unit 5. In this case, the matching counter element is embodied on the rear side of the screen unit 1.

The touch panel 6 integrated into the screen unit 1 transmits data, via the first connection 3 and the connector 15, to a control device 12 for the touch panel 6, which is also embodied on the printed-circuit board of the control unit 5. As a result, the touch panel 6 integrated into the screen unit 1 is connected via the first connection 3 to the control unit 5. The data to be transmitted are preferably analogue data which reproduce the region on the touch panel 6 touched by the user. These analogue data are further processed in the control device 12 for the touch panel 6.

The control device 12 for the touch panel 6 further contains calibration data, by means of which a further operation is guaranteed even after a replacement of the output unit 2. These calibration data include, inter alia, the size of the touch panel 6. The control device 12 for the touch panel 6 processes the analogue data supplied via the first connection 3 and makes these available to the output unit 2 via a digital interface. This digital interface is preferably a USB interface or an interface compatible with the USB interface. However, for example, an RS232 interface can also be used. The use of other digital interfaces is also possible.

The control device 12 for the touch panel 6 embodied on the control unit 5 is connected to the output unit 2 via the second connection 4. In FIG. 1, this connection is made via connectors 13 and 14, and via the connected cable. However, the second connection 4 can also be a plug connection. Via this second connection 4, it is possible for the control device 12 for the touch panel 6 to exchange data via the USB protocol with the output unit 2. As already mentioned, other protocols can be used, provided these are supported by the output unit 2. In the illustrated exemplary embodiment according to the invention, it is necessary for the output unit 2 to contain a USB controller 8. In modern computer systems, this USB controller 8 is integrated directly in the bridge (Southbridge).

It is particularly advantageous if the control device 12 of the touch panel 6 is supplied with electrical energy directly through the USB bus via the second connection 4. As a result, it is possible for the touch panel 6 to continue being active even when the screen unit 1 is switched off. The user must then only touch the touch panel, thereby introducing a switchover from stand-by operation into normal operation.

Furthermore, an EDID-EEPROM 11 is arranged on the control unit 5. The properties of the screen unit 1 are stored in this EDID-EEPROM 11. These are data such as the screen size, the timing rate and the manufacturer. Dependent upon the EDID version, this can be a 128-byte or 256-byte data structure. The EDID-EEPROM 11 arranged on the control unit in the exemplary embodiment illustrated in FIG. 1 is connected to the graphic chip 7 of the output unit 2 via the second connection 4. The graphic chip 7 reads the values stored in the EDID-EEPROM 11 and then adjusts the display data in such a manner that these can be output by the screen unit 1. By preference, the EDID-EEPROM 11 is read out by an I²C-compatible connection, wherein the EDID-EEPROM 11 can then also be read out, even if the screen unit 1 is switched off.

Furthermore, the screen unit 1 with touch panel 6 according to the invention and the control unit 5 can be supplied with electrical energy via the second connection 4. This electrical energy is generated in the output unit 2 by an electronic power component 9 and supplied to the control unit 5 via the second connection 4. The electronic power component 9 can be, for example, a linear controller. To allow the required power to be transmitted, it is meaningful to select a high-voltage, so that the resulting current can be kept small, and a foil cable can be used. In this context, several wires of the foil cable can be connected in parallel in order to distribute the necessary current in an optimum manner.

If the output unit 2 is a computer system, voltages of, for example, 12V are conventional. At least one electronic power component 16, which is connected to the electronic power component 9 on the output unit 2, is also disposed in the control unit 5. The electronic power component 16 on the control unit 5 converts the voltage which is connected from the electronic power components 9 into different voltages and stabilizes these. For example, the screen unit 1 with associated controller, which is not illustrated in FIG. 1, is supplied with electrical energy via the electronic power component 16. Furthermore, additional components, such as the LVDS receiver and other logic components not illustrated are supplied with electrical energy via the electronic power component 9.

Dependent upon the embodiment according to the invention, the output unit 2 can switch off the electronic power component 9 and/or the electronic power component 16. This takes place via a control signal which is not illustrated but which is also transmitted dependent upon the embodiment via the second connection 4. The supply of electrical energy to the consumers connected to the electronic power components 9, 16 is therefore interrupted. The stand-by operation of the screen unit 1 according to the invention can also be achieved in this manner.

By preference, the screen unit 1 is an LCD screen unit 1, wherein a driver for an LED background lighting of the LCD screen unit 1 is arranged on the control printed-circuit board. In the exemplary embodiment according to the invention, this driver is integrated in the electronic power component 16, wherein it can also be embodied as an independent component. The driver can be operated within a broad voltage range from approximately 3.3V up to approximately 12V. The brightness of the LED background lighting can be adjusted via a PWM signal (pulse-width modulation). This PWM signal is generated, for example, by the graphic chip 7 on the output unit 2 and communicated to the electronic power component 16 via the second connection. The stand-by operation can also be realized through the selection of a pulse-pause ratio of 0% in the PWM signal.

In a further exemplary embodiment which is not illustrated further, another microcontroller can be provided on the printed-circuit board of the control unit 5, which generates the PWM signal. The output unit 2 communicates the pulse-pause ratio to be adjusted to the microcontroller via a further interface. For example, an I²C, by means of which the EDID-EEPROM 11 is already connected to the output unit 2, can serve as the interface. Similarly, the contrast of the graphic chip 7 of the output unit 2 to be adjusted is transmitted via the second connection 4 to the controller of the screen unit 1, which is not illustrated in FIG. 1.

An LVDS receiver 10 is also arranged on the control unit 5. This LVDS receiver 10 is connected via the second connection 4, on the one hand, directly to the one LVDS transmitter and, on the other hand, via the first connection 3 to the controller of the screen unit 1, which is not illustrated. The LVDS transmitter is integrated directly in the graphic chip 7 of the output unit 2. A parallel datastream, or, in this case, a parallel digital RGB interface can be serialized via this LVDS interface and transmitted with a high data rate because of the relatively low voltage level. The transmission is insensitive to direct clock disturbances because of the differential transmission. Further lines can be economized as a result of this serialization. The LVDS receiver 10 converts the serial datastream back into a parallel datastream. In the exemplary embodiment according to the invention shown, the data to be displayed on the screen unit 1 are communicated by the graphic chip 7 via the LVDS interface to the controller of the screen unit 1, which is not illustrated.

In a further exemplary embodiment according to the invention, which is not illustrated, the screen unit 1 is connected directly to the display port terminal of the graphic chip 7 of the output unit 2 via the first connection 3 and the second connection 4.

Figure 2:
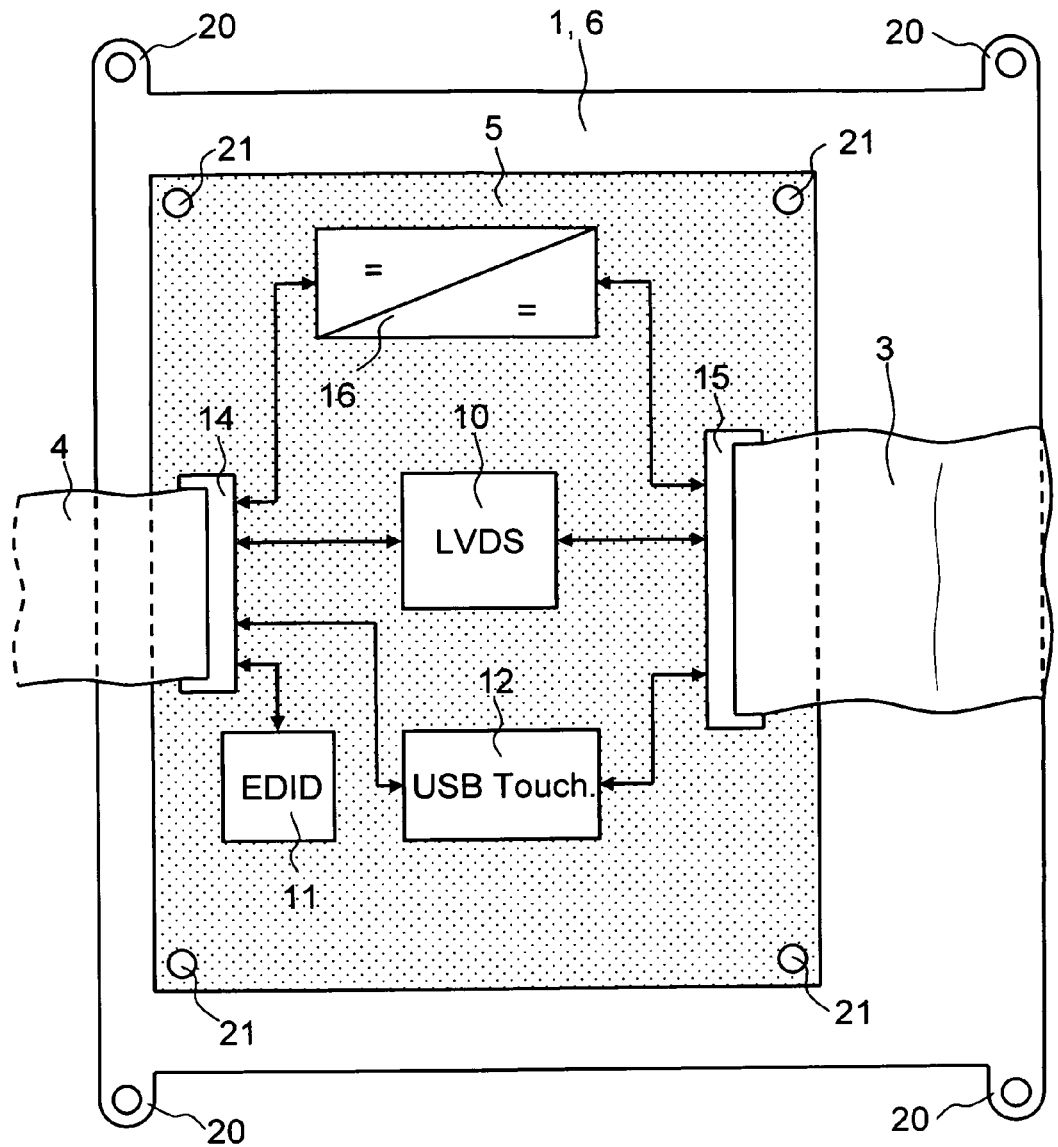
FIG. 2 shows a detail view of the assembled control unit with the necessary components and connections of the screen unit with touch panel according to the invention.

FIG. 2 shows a detail view of a further exemplary embodiment of the screen unit 1 with touch panel 6 according to the invention together with the control unit 5. The structure and functioning of the further exemplary embodiment according to the invention illustrated in FIG. 2 is largely identical to the exemplary embodiment according to the invention already described in FIG. 1, to which reference is therefore made. The printed-circuit board of the control unit 5, on which the connectors 14 and 15, the electronic power component 16, the LVDS receiver 10, the control device 12 for the touch panel 6 and the EDID-EEPROM 11 are arranged, is clearly visible.

By way of difference from FIG. 1, the printed-circuit board of the control unit 5 provides circular recesses 21. The control unit 5 embodied on the printed-circuit board is attached externally to the rear side of the housing of the screen unit 1 in a rigid manner. The attachment is made by means of a screw connection. For this purpose, the housing of the screen unit 1 provides corresponding recesses 21 alongside those of the printed-circuit board of the control unit 5. These recesses 21 are preferably embodied at the corners of the printed-circuit board. The printed-circuit board of the control unit 5 and the screen unit 1 with the touch panel 6 are connected rigidly to one another and form a module unit. This module unit can readily be tested with regard to its functionality and is then inserted into the device to be manufactured during final assembly. Following this, only the second connection 4 between the control unit 5 and the output unit 2 must be made.

As already explained, this second connection 4 is preferably made by means of a foil cable. Because of its thin and flexible form, the foil cable can be laid in a form-fit manner within a housing. Dependent upon the application, the length of the foil cable can be selected to be different without major additional costs. This guarantees that the cable for the second connection 4 is not under tension and that it is also not so long that it can no longer be laid in a form-fit manner inside the housing.

These advantages cannot be provided with the use of another type of cable. In particular, twisted and shielded lines are actually more robust, but at the same time, they are less flexible and therefore significantly more cost intensive. Especially for differential communications procedures within a device, these properties are not absolutely necessary, so that foil cables provide a better alternative.

FIG. 2 shows a further the formation of several flanges 20 which are embodied on at least two corners of the screen unit 1. By means of these flanges 20, the module unit, which comprises the screen unit 1 with the touch panel 6 and the printed-circuit board of the control unit 5, can be attached to the housing of the device to be integrated. In the exemplary embodiment, this attachment is also a screw connection.

Figure 3:
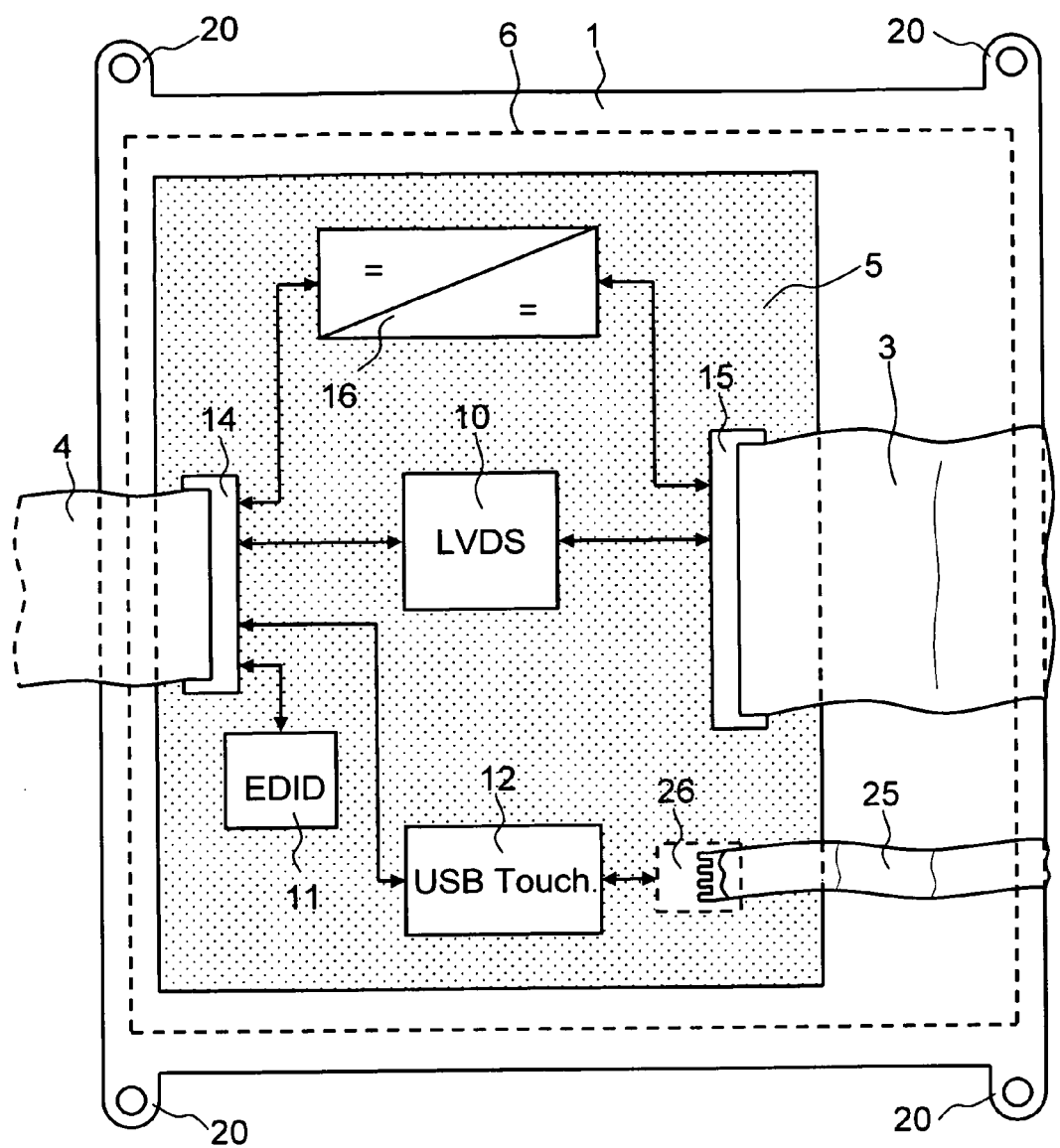
FIG. 3 shows a detail view of a further exemplary embodiment according to the invention of the assembled control unit with the necessary components and connections of the screen unit with touch panel according to the invention.

FIG. 3 shows a detail view of a further exemplary embodiment according to the invention of the screen unit 1 with touch panel 6 together with the control unit 5. The structure and functioning of the exemplary embodiment shown in FIG. 3 is largely identical to the exemplary embodiment described in FIG. 1, to which reference is therefore made.

The printed-circuit board of the control unit 5, on which the connectors 14 and 15, the electronic power component 16, the LVDS receiver 10, the control device 12 for the touch panel 6 and the EDID-EEPROM 11 are arranged, are clearly evident. As is also illustrated in FIG. 1, the printed-circuit board of the control unit 5 is attached externally to the rear side of the housing of the screen unit 1 in a rigid manner. However, by contrast with the exemplary embodiment according to the invention shown in FIG. 2, the printed-circuit board of the control unit 5 is not screw connected to the rear side of the housing but glued. Especially with very thin screen units 1, a borehole is often not possible. However, an additional screw connection, as shown in FIG. 2, is possible if the screen unit 1 allows this. The control unit 5 formed on the printed-circuit board is also attached externally to the rear side of the housing of the screen unit 1 in a rigid manner.

FIG. 3 also shows the formation of several flanges 20 which are formed on at least two corners of the screen unit 1. By means of these flanges 20, the module unit, which comprises the screen unit 1 with the touch panel 6 and the printed-circuit board of the control unit 5, can be attached to the housing of the device to be integrated. This attachment is also preferably a screw connection. According to the description associated with FIG. 2, the screen unit 1 is also connected to the output unit 2 in the exemplary embodiment from FIG. 3 and screw connected to the device to be integrated.

However, the touch panel 6 is no longer directly integrated into the screen unit 1. Instead, the touch panel 6 is glued onto the screen unit 1 and connected via a first connection 25 to the control unit 2. In FIG. 3, this first connection 25 is illustrated as a cable connection. It is also conceivable that it is a plug connection. In FIG. 3, the touch panel 6 itself is illustrated as a dotted rectangular area, which is glued directly onto the visible image region of the screen unit 1. Since the touch panel 6 outputs analogue data, fewer lines are required for the transmission, so that the foil cable can be soldered directly onto a terminal pad 26 of the printed-circuit board of the control unit 5. Of course, the foil cable of the first connection 25 can also be connected to a connector in the form of a ZIF connector. The touch panel 6 is connected to the control device 12 for the touch panel 6 via the terminal pad 26 and the third connection 25. If foil cables are used, the structural height is only marginally increased, because these contact the housing surrounding them in a smooth and absolutely form-fit manner. In the drawings, this cable connection is illustrated with exaggerated waviness in order to indicate that this is a cable connection.

Figure 4:
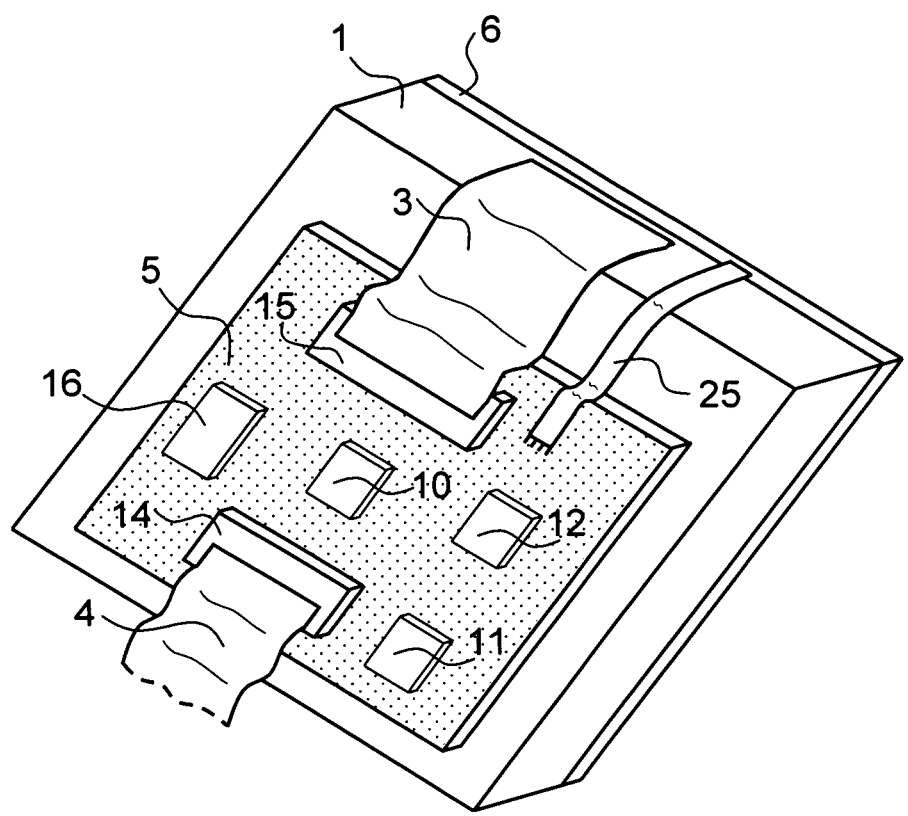
FIG. 4 shows spatial view of the screen unit with touch panel and control unit according to the invention together with the necessary components and connections.

FIG. 4 shows a possible illustration of the screen unit 1 with touch panel 6 which is not spatially to scale. It is evident that the touch panel 6 in this exemplary embodiment according to the invention is not integrated directly in the screen unit 1. In FIG. 4, the touch panel 6 is glued onto the screen unit 1. The printed-circuit board of the control unit 5 is attached externally to the rear side of the housing of the screen unit 1. The third connection 25 is made via a foil-cable connection from the touch panel 6 to the printed-circuit board of the control unit 5. The foil cable contacts the touch panel 6 of the screen unit 1 and the panel of the control unit 5 in a form-fit manner here.

The first connection 3 is also implemented via a foil cable connection extending from the screen unit 1 to the printed-circuit board of the control unit 5. In this context, the foil cable contacts the screen unit 1 and the printed-circuit board of the control unit 5 in a form-fit manner. Furthermore, the connectors 14 and 15, the electronic power component 16, the LVDS receiver 10, the control device 12 for the touch panel 6 and the EDID-EEPROM 11 are also recognizable. Further necessary components, such as capacitors and resistors for the termination of lines have not been shown in FIG. 4 to ensure a clear overview.

Overall, the present embodiment according to the invention advantageously provides a solution which allows the provision of a module unit comprising the screen unit 1 with touch panel 6 and a control unit 5, which communicates via a single interface with an output unit, so that an individual implementation of the necessary component groups is not required in all devices in which this module unit is to be used. This saves a significant amount of development and testing time. For this purpose, only the connector 13 must be provided on an output unit and correctly wired.

In this context, it is particularly advantageous that the necessary driver components are already integrated on the printed-circuit board of the control unit 5, and these no longer need to be considered in the development of a further device. Computer systems which are based on X86 and also systems with ARM processors, for which the invention is preferably intended, are already manufactured with the necessary interfaces. Particularly in the case of small production runs with fewer than 1000 screen units 1 per year, the screen units 1 can, in a very advantageous manner, be retro-fitted with a touch panel 1 and a control unit 5, without needing to change the basic manufacture of the screen unit 1.

In a further exemplary embodiment according to the invention which is not illustrated, the control unit 5 is integrated directly into the screen unit 1. This can be realized through various techniques. To a substantial extent, a TFT screen unit comprises transistors. Additional transistors, with which further complex functions can be realized, are added to the existing transistors. Hitherto, the row and column decoders have been realized in this manner. However, with this technology, it is also possible to integrate all integrated circuits of the control printed-circuit board 5, such as the EDID-EEPROM 11, the LVDS receiver 10 or the control device 12 for the touch panel 6 directly in the screen unit 1.

Especially more highly integrated circuits can also be applied using COG-technology directly on the glass substrate of the screen unit 1. This applies, for example, for the electronic power component 16 for the LED background lighting or also for the other integrated circuits. With the use of one of these two technologies, a control printed-circuit board 5 can be dispensed with completely.

The invention is not restricted to the exemplary embodiments illustrated. All of the elements described and/or illustrated can be combined with one another as required within the scope of the invention.

The invention claimed is:

1. An apparatus, comprising:
   a control unit;
   a screen unit connected via a first single cable connection to the control unit, wherein the screen unit includes a touch panel integrated therewith and connected solely to the control unit via the first single cable connection,
   the control unit is connected via a second single cable connection to an output unit, wherein the control unit and the screen unit are configured to be powered by electrical energy via the second single cable connection, and
   wherein data for controlling the screen unit are transmitted to the screen unit via both first and second single cable connections, and wherein, via the second single cable connection only, display data to be visualized are sent to the screen unit and position data from the touch panel are transmitted to the output unit.

2. The apparatus according to claim 1, wherein the control unit is formed on a printed circuit board which is connected to the screen unit in a rigid manner, or that the control unit is integrated into the screen unit.

3. The apparatus according to claim 1, wherein a third connection is a cable connection and/or a plug connection.

4. The apparatus according to claim 1, wherein a control device for the touch panel is provided as a component of the control unit and is connected to the output unit via the second connection.

5. The apparatus according to claim 4, wherein the control device for the touch panel contains calibration data, and accordingly a further operation is guaranteed even after a replacement of the output unit.

6. The apparatus according to claim 4, wherein the control device for the touch panel exchanges data with the output unit via a USB protocol.

7. The apparatus according to claim 4, wherein via the second connection, the control device for the touch panel is supplied with electrical energy on or in the control unit, and that the touch panel continues to be active even when the screen unit is switched off.

8. The apparatus according to claim 2, wherein the printed circuit board of the control unit is attached externally to the rear of a housing of the screen unit in a rigid manner.

9. The apparatus according to claim 8, wherein the control unit is glued and/or screwed to the rear of the screen unit in a rigid manner.

10. The apparatus according to claim 1, further comprising an LVDS receiver, which is connected via the second connection to an LVDS transmitter, is arranged on or in the control unit, and that the LVDS transmitter is integrated in a graphic chip of the output unit, or the screen unit is connected directly to a display-port terminal of a graphic chip of the output unit via the first connection and the second connection.

11. The apparatus according to claim 1, wherein an EDID-EEPROM is arranged on the control unit, and the former is connected to the graphic chip of the output unit via the second connection.

12. The apparatus according to claim 1, wherein the screen unit is an LCD screen unit, and a driver for an LED background lighting is arranged on the control printed-circuit board.

13. The apparatus according to claim 12, wherein the brightness of the LED background lighting is adjustable via a PWM signal which is supplied via the second connection.

14. The apparatus according to claim 1, wherein the cable connections are foil cables.

15. The apparatus according to claim 1, wherein the output unit is a computer system.

* * * * *